United States Patent [19]
Noh

[11] Patent Number: 5,055,952
[45] Date of Patent: Oct. 8, 1991

[54] AUTOMATIC TRACK FINDING (ATF) CONTROLLER FOR DIGITAL AUDIO TAPE RECORDER

[75] Inventor: Il-Young Noh, Suwon, Rep. of Korea
[73] Assignee: SamSung Electronics Co., Ltd., Suwon, Rep. of Korea
[21] Appl. No.: 424,828
[22] Filed: Oct. 20, 1989
[30] Foreign Application Priority Data
Dec. 31, 1988 [KR] Rep. of Korea ............... 18130/1988
[51] Int. Cl.$^5$ ............................................ G11B 5/584
[52] U.S. Cl. ................................ 360/77.14; 360/77.15
[58] Field of Search ................ 360/77.13, 77.14, 77.15

[56] References Cited
U.S. PATENT DOCUMENTS
4,890,173 12/1989 Yokozawa ........................ 360/77.15
4,899,233  2/1990 Yoshida .......................... 360/77.13 X
4,920,435  4/1990 Yamazaki ......................... 360/77.15

Primary Examiner—Vincent P. Canney
Assistant Examiner—David L. Robertson
Attorney, Agent, or Firm—Robert E. Bushnell

[57] ABSTRACT

The ATF controller is a system capable of producing an offset signal according to the level difference between two channels after digital conversion of pilot signal in ATF controller of DAT. The automatic track finding controller for digital audio tape recorder comprises: low-pass filter for detecting only the pilot signal by filtering a reproduced signal from a digital tape; band-pass filter for detecting synchronous signal of tracks A and B from said reproduced signal; analog/digital converter for converting output of said low-pass filter into digital pilot signals; controller detecting a level difference between the digital pilot signals as well as generating first to third control signals to control storage of components of the digital pilot signal and an offset value, after acknowledging a corresponding track by said synchronous signal; first register for storing a pilot crosstalk component of an adjacent track by the first control signal; second register for storing a pilot crosstalk component of another adjacent track by the second control signal; third register for storing the offset value developed according to a level difference between the digital pilot signals; an adder for compensation for ATF error by combining the outputs of said first to third registers; and tracking error-signal generator for controlling tracking by generating a PWM signal according to the output of the adder.

12 Claims, 4 Drawing Sheets

AUTOMATIC TRACK FINDING (ATF) CONTROLLER FOR DIGITAL AUDIO TAPE RECORDER

BACKGROUND OF THE INVENTION

This invention relates to an Automatic Track Finding (ATF) controller for Digital Audio Tape Recorder (hereinafter referred to as "DAT"), particularly capable of performing the ATF operation by an offset adjustment of a level difference between two separate channels after digital conversion of a pilot signal detected.

Generally, in DAT, digital audio data and ATF track pattern are recorded onto a tape as in FIG. 1. The DAT system reproduces each audio data which is recorded on an odd frame address track and an even frame address track, with two heads, A and B. In the DAT tape shown in FIG. 1, (A) is plus azimuth track and (B) is minus azimuth track both of which are areas for writing PCM audio data, IBG is a guide area to separate PCM data from ATF signal. In such a configuration of ATF signal, f1 is a recording area of 130.67-KHz pilot signal, f2 is a recording area of 522.67-KHz first synchronization signal SYNC1, f3 is a recording area of 784.00-KHz second synchronization signal SYNC2 and f4 is a recording area of 1.568-KHz tape erase signal.

Referring to the above described tape configuration, there will be understood that the first synchronization signal f2 is recorded on the track (A) and the second synchronization signal f3 is recorded in track (B), wherein since width of head is 1.5 times as large as that of track on the tape, when the head passes a certain synchronization signal f2 or f3, it overlaps the pilot signal f1 of a first adjacent track, and after passing two blocks, it overlaps the pilot signal f1 of a second adjacent track.

In the DAT using the tapes formatted as above described, the running of tape and tracking of drum are controlled by using said signals. That is, since heads of a conventional DAT are constructed with two heads (A and B), there arises in reproduction a level difference upon pilot signals between two channels according to the head characteristics. To compensate this difference, there has been used a known circuit shown in FIG. 2, wherein among RF signals reproduced by the heads, a pilot signal on each channel is detected by low-pass filter 21 and the detected pilot signal is amplified by an amplifier 22. Here, feedback output controlled by switches SWA,SWB connected through feedback resistors R2,R1 is supplied to a negative input of the amplifier 22, wherein SWA is a selection switch for a channel A and SWB is that for a channel B. And R1, C1 and VR1 are for determining a time constant to adjust the gain of channel A, while R2, C2 and VR2 is for channel B. So, the level difference due to the characteristics of heads A and B is adjusted by the switches SWA, SWB. The output of Amplifier 22 which is gain-adjusted by the above manner is inputted to a sample and hold circuit through a peak hold section after being rectified at a rectifier 23. Referring to FIG. 3, a pilot signal for each track is detected through the heads on time period 3a, the crosstalk of pilot signal on the first adjacent track (upper track) is detected on time period 3b, and the crosstalk of pilot signal on the second adjacent track (lower track) is detected on time period 3c. Therefore, at the time period 3b, the first sample and hold circuit 25 holds the crosstalk of pilot signal of the upper track generated at the peak hold section 24, while the time period 3c, the peak hold 24 holds the crosstalk of pilot signal of the lower track. Thus, an adder 26 evaluates an output difference of the first sample and hold circuit 25 from output of the peak hold section 24, and passes it to the second sample and hold circuit 27. Here, the signal 3d held at the second sample and hold circuit 27 is so called an ATF error voltage by which the controller of DAT performs the function of AFT. But there have been some problems in adjusting the various parameters and the time constant for compensation of level difference in the assembly process, since in the conventional ATF control circuit, the adjustment of level difference due to the head characteristics of two channels A and B can be done by applying two adjusting points and the compensation of level difference may be made by generating its compensating time constant through an analog circuit for each channel, simultaneously.

OBJECT OF THE INVENTION

Therefore, an object of this invention is to provide a system which is capable of producing an offset signal according to the level difference between two channels after digital conversion of pilot signal in ATF controller of DAT.

Another object of this invention is to provide a system capable of performing the ATF function automatically by adding and subtracting the offset signal in the ATF controller of DAT.

To achieve the above objects and other various advantages of the present invention, an automatic track finding controller for digital audio tape recorder comprises:

low-pass filter for detecting only the pilot signal by filtering a reproduced signal from a digital tape;

band-pass filter for detecting synchronous signal of tracks A and B from said reproduced signal;

analog/digital converter for converting output of said low-pass filter into digital data;

controller detecting a level difference between the heads A and B as well as generating first to third control signals to control the digital pilot signal, after acknowledging a corresponding track by said synchronous signal;

first register for storing a pilot crosstalk component of an adjacent track by the first control signal;

second register for storing a pilot crosstalk component of another adjacent track by the second control signal;

third register for storing an offset value according to a level difference between the heads A and B generated at the controller by said third control signal;

adding means for compensating the offset value due to the level difference of pilot signal by operating outputs of said first to third registers; and tracking error-signal generator for controlling tracking by generating a PWM signal according to the output of said adding means.

BRIEF DESCRIPTION OF THE DRAWINGS

The foregoing and other objects, features and advantages of the invention will be apparent from the following more particular description of a preferred embodiment of the invention, as illustrated in the accompanying drawings, wherein.

DETAILED DESCRIPTION OF THE INVENTION

Figure 4:
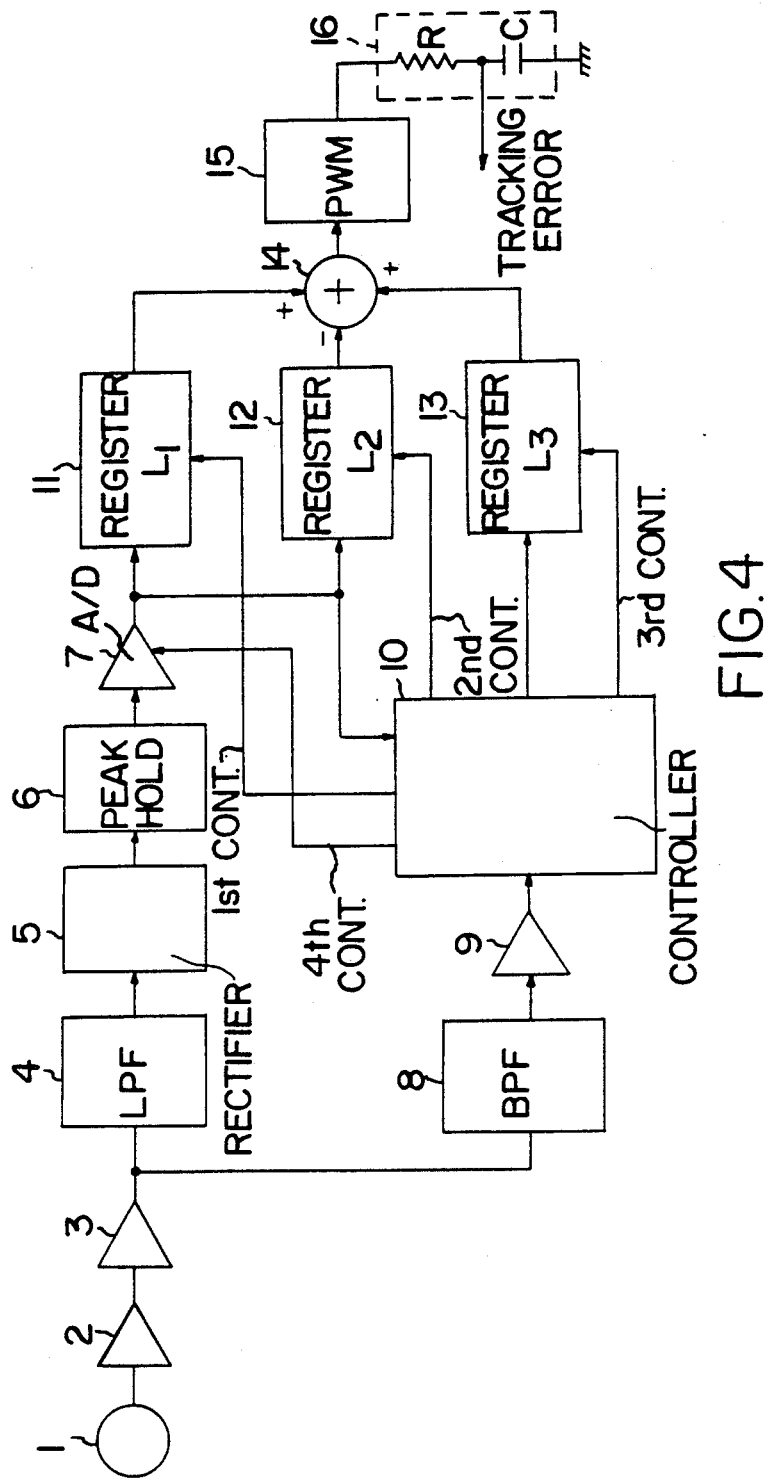
FIG. 4 shows a preferred embodiment of ATF controller according to the invention.

Referring to FIG. 4, the preferred embodiment of ATF controller according to the invention comprises a drum 1 generating RF signal by reading data recorded on each channel of tape through two heads A and B, an RF amplifier 2 for amplifying said RF signal, a buffer 3 for buffering output of said RF amplifier 2, a low-pass filter 4 for detecting a pilot signal of each channel among the output of said buffer 3, a rectifier 5 rectifying in full-waveform an output of said low-pass filter 4, a peak hold section 6 that holds peak value of output of said rectifier 5, an A/D converter 7 that converts the output of said peak hold section 6 to digital data, a band-pass filter 8 for detecting a synchronous signal of each channel among the outputs of said buffer 3, a limiter 9 that limits and then digitalizes the output of said band-pass filter 8, a controller 10 that produces first to third control signals according to the outputs of said A/D converter 7 and limiter 9, thereby controlling the system, a first register 11 storing crosstalk of pilot signal of the first adjacent track of said A/D converter 7 by said first control signal, a second register 12 storing crosstalk of pilot signal of the second adjacent track of said A/D converter 7 by said second control signal, a third register 13 storing an offset value by third control signal, according to the level difference of pilot signals between the channels A and B outputted from said controller 10, an adder 14 that perform adding operation from outputs of the first to third register 11 to 13, a PWM generator 15 for generating PWM signal to control the track error by the output of said adder 14, and an integrator 16 having a resistor and a capacitor for low-pass filtering the output of said PWM generator 15.

Figure 1:
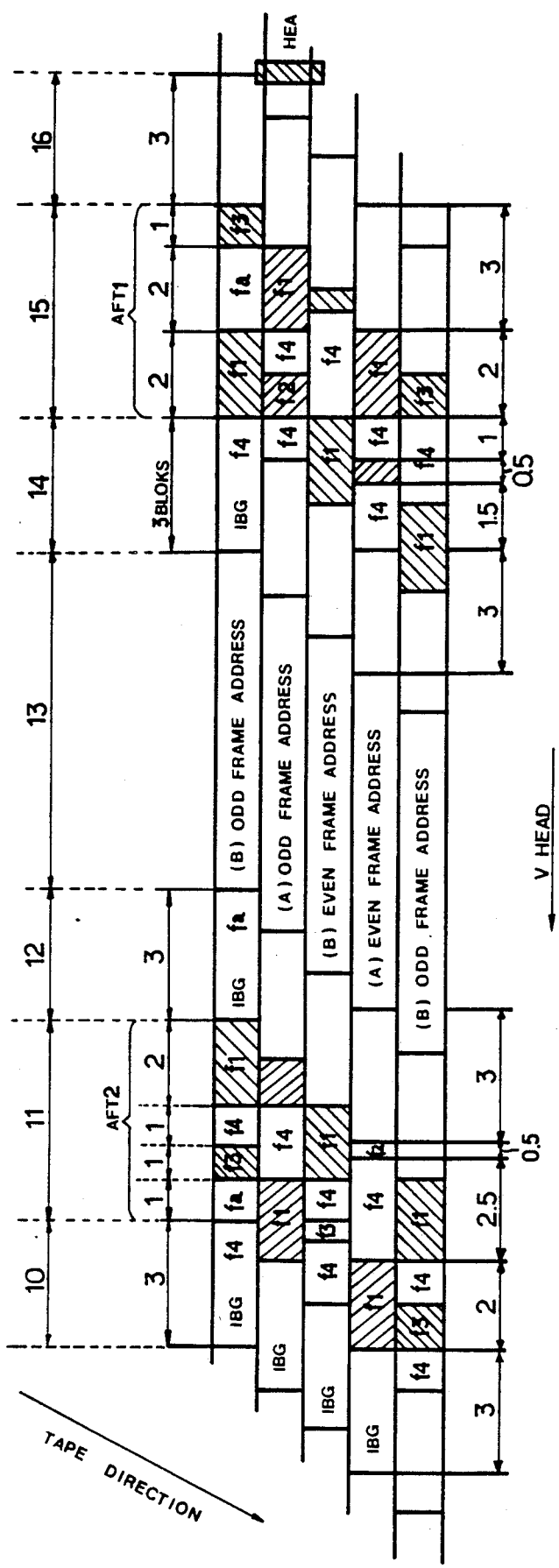
FIG. 1 shows an ATF track pattern format recorded on tape.
Figure 2:
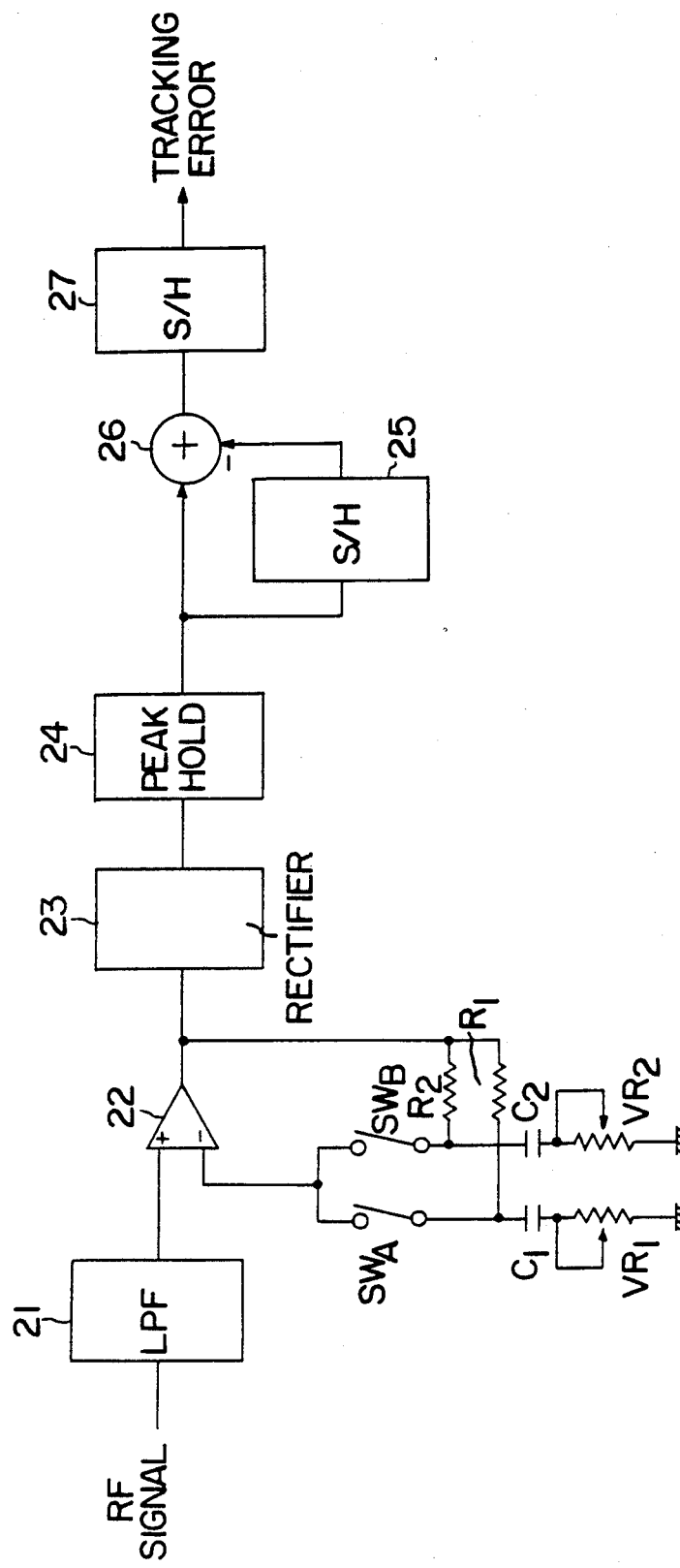
FIG. 2 shows a conventional ATF controller.
Figure 3:
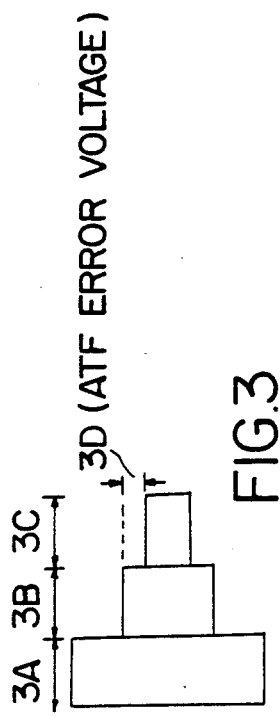
FIG. 3 shows an ATF error-voltage detection waveform according to the FIG. 2.
Figure 5:
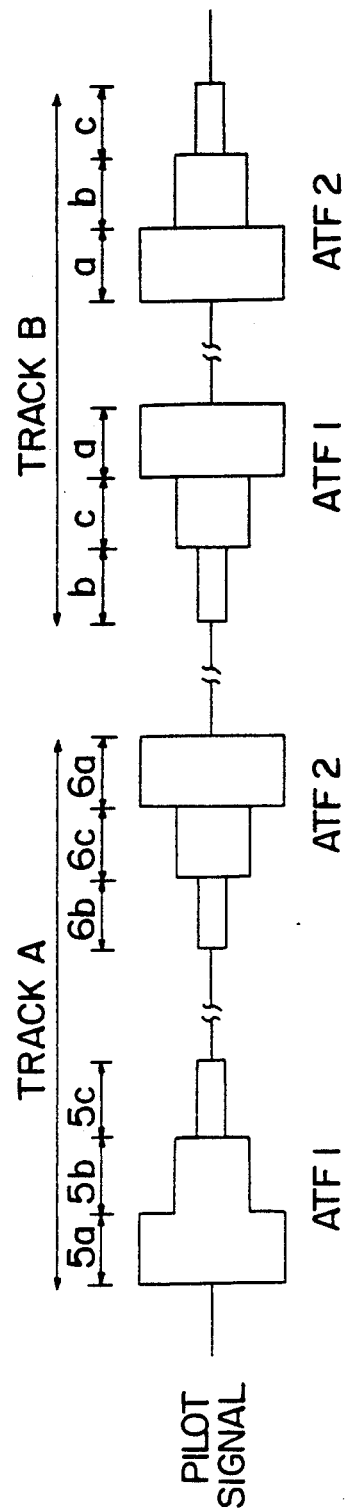
FIG. 5 shows an example of output waveform of pilot signal in accordance with the invention.

FIG. 5 is an output waveform of pilot signal, wherein it is shown that the head A detects a pilot signal and subsequently a crosstalk amount of the pilot signal in the first and second adjacent tracks when it traces the track A of channel A according to the ATF pattern as shown in FIG. 1, and the head B detects crosstalk of the pilot signal of the first and second adjacent tracks and subsequently a pilot signal of track in a corresponding channel B when it traces the track of channel B.

This invention will be described in more detail with reference to the FIG. 1, 4 and 5, hereinafter. The track pattern to perform an ATF operation for DAT has the same configuration as shown in FIG. 1 and the waveform as shown in FIG. 5 will be generated by low-pass filtering only the pilot signal while the heads A and B of a drum trace the track A and B, respectively. The RF signal reproduced by the head of drum 1 is applied to the first low-pass filter 4 and the band-pass filter 8 through the RF amplifier 2 and the buffer 3. The low-pass filter 4 only detects the pilot signal out of the RF signals, which is totally shown as in FIG. 5 with respect to both spans of the heads A and B. And the band-pass filter 8 detects the ATF synchronous signal; f2 signal for track A and f3 signal for track B, respectively. The pilot signal filtered by said first low-pass filter 4 is applied to the A/D converter 7 through the rectifier 5 and the peak hold section 6 and then converted into digital signal by the fourth control signal (sampling clock) generated at the controller 10. Then, the controller 10 can acknowledge which pilot signal among the pilot signals as shown in FIG. 5 has been generated, by analyzing the output of said A/D converter 7 with reference to the ATF synchronous signal received after digital conversion through the limiter 9.

For example, when the head A traces the track of channel A, it reproduces a pilot signal of corresponding each channel as 5a, a pilot signal of its upper track as 5b, and a pilot signal of its lower track as 5c, in sequence. However, when it passes IBG area and PCM data record area, it reproduces firstly a pilot signal of upper track as 6b, and then that of lower track as 6c, thereafter reproducing a pilot signal of each corresponding track as 6a. Here, in case of the head A tracing the track A normally, 6b and 6c are the components of crosstalk that is generated by pilot signal of upper and lower tracks of its adjacent channel B.

In playback mode, there may arise a level difference of signals which is produced at heads A and B. To perform an efficient ATF operation, the level of pilot signals reproduced in the heads A and B must be totally uniform. So, the controller 10 generates the third control signal and thereby latches a pertinent offset value of level difference between the two heads to the third register 13 at pilot signal position of each corresponding track to compensate the level difference between heads A and B. Next, two heads alternately compare the level difference of each crosstalk component at the reproducing position of pilot crosstalk component between the two track as shown in FIG. 5. After that, the controller detects pilot crosstalk component of one track outputted from the A/D converter 7, by generating the second control signal in timing (b), and then stores the detected crosstalk into the second register 12. In the like manner, it detects pilot crosstalk components of another track, by generating the first control signal in timing (c), and then stores the detected component into the first register 11. Then, the adder 14 subtracts from the output of the first register 11 the output of the second register 12, and thereafter adds the output of the third register 13 which stores the offset value according to the level difference of pilot signal between head A and B. Thus, the ATF error voltage can be compensated exactly. Therein, the output of the third register must be controlled to be added towards only the low-level head according to a level difference of the reproduced signal of heads A and B, selectively. In the first reproducing, these operations are carried out simultaneously with the operation of offset control circuit. Thus, once offset value fixed, only the error difference calculation is accomplished according to the crosstalk components between the two heads. Said offset adjustment performs error compensation operation two times by ATF1 and ATF2, as shown from the pattern in FIG. 5.

As above, compensating the ATF error in the adder 14, the output is applied to the PWM generator to generate the PWM signal for the motor driving. And said PWM signal is inverted to the DC signal through the integrator 16 having register R and capacitor C, and applied as ATF control signal.

As described above, there may be advantages capable of performing the function of ATF automatically through digital conversion of the pilot signal, calculating arithmetically the level difference between the two tracks to offset the difference, and adding and subtracting the offset signal in the actual execution of ATF in the DAT.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. An automatic track finding (ATF) controller for a digital audio tape recorder, wherein an automatic track finding function is performed by using pilot signals reproduced through two heads, comprising:

a low-pass filter means for passing only the pilot signals by filtering a reproduced signal from a digital tape;

a band-pass filter means for detecting synchronous signals of two adjacent tracks A and B from said reproduced signal;

analog/digital converter means for converting said pilot signals passed by said low-pass filter means into digital pilot signals;

controller means for detecting a level difference between said digital pilot signals and for generating first to third control signals to control storage of pilot crosstalk components of the digital pilot signals in response to said synchronous signals;

first register means for storing a pilot crosstalk component of an adjacent track in response to the first control signal;

second register means for storing a pilot crosstalk component of another adjacent track in response to the second control signal;

third register means for storing an offset value in response to said third control signal, said offset value being generated in response to said level difference detected by the controller;

adding means for combining the stored offset value and the stored pilot crosstalk components by controlling outputs of said first to third registers to generate an error voltage; and tracking error signal generator means for controlling tracking by generating a pulse width modulated signal according to the error voltage.

2. The automatic track finding (ATF) controller for a digital audio tape recorder as set forth in claim 1, further comprising:

full wave rectifying means for rectifying the pilot signals passed by said low-pass filter means and for generating rectified pilot signals; and peak hold means connected between said full wave rectifying means and said analog/digital conveyer means.

3. The automatic track finding (ATF) controller for a digital audio tape recorder as set forth in claim 2, further comprising:

limiter means connected to said band-pass filter means for limiting and digitizing said synchronous signals and for providing digitized synchronous signals to said controller means.

4. The automatic track finding (ATF) controller for a digital audio tape recorder as set forth in claim 3, wherein said tracking error-signal generator means comprises:

a pulse width modulator for converting said error voltage to said pulse width modulated signal; and an integrator responsive to said pulse width modulated signal for generating a tracking error signal.

5. The automatic track finding (ATF) controller for a digital audio tape recorder as set forth in claim 4, wherein said integrator is a low-pass filter.

6. An automatic track finding method using pilot signals picked up by two heads scanning adjacent tracks of a digital audio tape in a digital audio tape recorder comprising the steps of:

passing only the pilot signals included in a reproduced signal from said digital tape;

detecting synchronous signals included in said reproduced signal corresponding to said adjacent tracks;

converting said pilot signals to digital pilot signals in accordance with a sampling clock signal;

detecting a level difference between said digital pilot signals and generating an offset value;

generating first to third control signals in response to said synchronous signals;

storing crosstalk components of said pilot signals in response to said first and second control signals;

storing said offset value in response to said third control signal; and generating a tracking error control signal in response to the stored crosstalk components and the stored offset value.

7. The automatic track finding method as set forth in claim 6, wherein said passing step includes the steps of:

low pass filtering said reproduced signal for passing said pilot signals;

a full-wave rectifying said pilot signals passed in said passing step and for generating rectified pilot signals;

detecting and holding peak values of said rectified pilot signals and for providing said peak values as said pilot signals for conversion in said converting step.

8. The automatic track finding method as set forth in claim 7, wherein said step of detecting synchronous signals comprises the steps of:

filtering said reproduced signal to pass said synchronous signals; and limiting and digitizing said synchronous signals for use in said generating first to third control signals step.

9. The automatic track finding method as set forth in claim 8, wherein said step of storing said crosstalk components of said pilot signals comprises the steps of:

storing a first crosstalk component of a first one of said pilot signals of a first one of said adjacent tracks in response to said first control signal; and storing a second crosstalk component of a second one of said pilot signals of a second one of said adjacent tracks in response to said second control signal.

10. The automatic track finding method as set forth in claim 8, wherein said step of generating a tracking error control signal comprises the steps of:

combining said stored crosstalk components and said offset value for producing an error voltage;

converting said error voltage to a pulse width modulated signal; and integrating said pulses width modulated signal to produce said tracking error control signal.

11. The automatic track finding method as set forth in claim 9, wherein said step of generating a tracking error control signal comprises the steps of:

combining said stored first crosstalk component, said stored second crosstalk component and said offset value for producing an error voltage;
converting said error voltage to a pulse width modulated signal; and
integrating said pulses width modulated signal to produce said tracking error control signal.

12. The automatic track finding method as set forth in claim 11, wherein said step of combining comprises the steps of:

subtracting said second crosstalk component from said first crosstalk component and adding said offset value.

* * * * *

UNITED STATES PATENT AND TRADEMARK OFFICE
CERTIFICATE OF CORRECTION

PATENT NO. : 5,055,952

DATED : October 8, 1991

INVENTOR(S) : Il-Young NOH

It is certified that error appears in the above-identified patent and that said Letters Patent is hereby corrected as shown below:

Abstract,

Line 14, change "signal" to --signals--;

Claim 1, Column 5, Line 18, delete "a";

Claim 7, Column 6, Line 32, delete "a".

Signed and Sealed this

Sixteenth Day of March, 1993

Attest:

STEPHEN G. KUNIN

*Attesting Officer*  *Acting Commissioner of Patents and Trademarks*